US009608251B2

(12) United States Patent
Guen

(10) Patent No.: US 9,608,251 B2
(45) Date of Patent: Mar. 28, 2017

(54) BATTERY MODULE WITH ELECTRODE IDENTIFIER

(71) Applicants: SAMSUNG SDI CO., LTD., Yongin-si, Gyeonggi-do (KR); ROBERT BOSCH GMBH, Stuttgart (DE)

(72) Inventor: Min-Hyung Guen, Yongin-si (KR)

(73) Assignees: Samsung SDI Co., Ltd., Yongin-Si, Gyeonggi-do (KR); Robert Bosch GmbH, Stuttgart (DE)

( * ) Notice: Subject to any disclaimer, the term of this patent is extended or adjusted under 35 U.S.C. 154(b) by 803 days.

(21) Appl. No.: 13/925,998

(22) Filed: Jun. 25, 2013

(65) Prior Publication Data

US 2014/0193690 A1 Jul. 10, 2014

(30) Foreign Application Priority Data

Jan. 8, 2013 (KR) ........................ 10-2013-0002137

(51) Int. Cl.
   *H01M 2/20* (2006.01)
   *H01M 2/10* (2006.01)
   *H01M 2/30* (2006.01)
   *H01M 2/34* (2006.01)
   *H01M 10/04* (2006.01)

(52) U.S. Cl.
   CPC ......... *H01M 2/206* (2013.01); *H01M 2/1077* (2013.01); *H01M 2/305* (2013.01); *H01M 2/34* (2013.01); *H01M 10/0413* (2013.01)

(58) Field of Classification Search
   None
   See application file for complete search history.

(56) References Cited

U.S. PATENT DOCUMENTS

| 8,771,854 B2 | 7/2014 | Guen et al. |
| 9,005,800 B2 | 4/2015 | Park et al. |
| 2002/0070704 A1 | 6/2002 | Abe |
| 2010/0081048 A1 | 4/2010 | Nansaka et al. |

(Continued)

FOREIGN PATENT DOCUMENTS

| JP | 2000-306561 A | 11/2000 |
| KR | 10-2010-0036164 A | 4/2010 |

(Continued)

OTHER PUBLICATIONS

Korean Office Action dated Mar. 2, 2016.
Korean Office Action dated Sep. 19, 2016.

*Primary Examiner* — Ula C Ruddock
*Assistant Examiner* — Tony Chuo
(74) *Attorney, Agent, or Firm* — Lee & Morse, P.C.

(57) ABSTRACT

A battery module includes a plurality of rechargeable batteries, each rechargeable battery including a first electrode end and a second electrode end protruding outside a case of the rechargeable battery, a first top insulation member at a bottom of the first electrode end, and an identifier on the first top insulation member, a bus bar electrically connecting ends of neighboring rechargeable batteries, a bottom housing including a space, the rechargeable batteries being arranged in the space of the bottom housing, and a top cover attached to the bottom housing, the top cover including a recognizer the fits with the identifier.

14 Claims, 15 Drawing Sheets

(56) References Cited

U.S. PATENT DOCUMENTS

| | | | | |
|---|---|---|---|---|
| 2010/0173178 A1* | 7/2010 | Kim | ........................ | H01M 2/06 |
| | | | | 429/1 |
| 2010/0227212 A1 | 9/2010 | Kim | | |
| 2010/0233529 A1* | 9/2010 | Nansaka | ............... | H01M 2/021 |
| | | | | 429/181 |
| 2012/0114991 A1* | 5/2012 | Park | .................... | H01M 2/1077 |
| | | | | 429/82 |
| 2012/0183817 A1* | 7/2012 | Guen | ..................... | H01M 2/30 |
| | | | | 429/61 |

FOREIGN PATENT DOCUMENTS

| | | |
|---|---|---|
| KR | 10-2010-0099596 A | 9/2010 |
| KR | 10-2012-0039308 | 4/2012 |
| KR | 10-2012-0050112 A | 5/2012 |
| KR | 10-2012-0082590 A | 7/2012 |

\* cited by examiner

BATTERY MODULE WITH ELECTRODE IDENTIFIER

CROSS-REFERENCE TO RELATED APPLICATION

This application claims priority to and the benefit of Korean Patent Application No. 10-2013-0002137, filed in the Korean Intellectual Property Office on Jan. 8, 2013, the entire contents of which are incorporated herein by reference.

BACKGROUND

1. Field

Example embodiments relate to a battery module. More particularly, example embodiments relate to a battery module with an improved configuration of an insulation member.

2. Description of the Related Art

A rechargeable battery can be repeatedly charged and discharged, unlike a primary battery that is incapable of being recharged. A small-capacity rechargeable battery can be used for a small electronic device, e.g., a mobile phone, a laptop computer, and a camcorder, and a large-capacity rechargeable battery can be used as a power source for driving a motor of a hybrid vehicle.

Lately, a high power rechargeable battery has been introduced. The high power rechargeable battery uses a high energy density non-aqueous electrolyte. The high power rechargeable battery includes a plurality of rechargeable batteries coupled in series. Such a high power rechargeable battery has been used for an apparatus requiring high power, e.g., for driving a motor of an electric vehicle.

A conventional single large-capacity rechargeable battery generally includes a plurality of rechargeable batteries connected in series, and such rechargeable batteries may have a cylindrical shape, an angular shape, or the like. To couple the rechargeable batteries in series, a bus bar may be installed to connect adjacent batteries, e.g., while a positive terminal of one rechargeable battery and a negative terminal of an adjacent battery are alternately disposed.

The above information disclosed in this Background section is only for enhancement of understanding of the background of the invention and therefore it may contain information that does not form the prior art that is already known in this country to a person of ordinary skill in the art.

SUMMARY

Example embodiments have been made in an effort to provide a battery module for preventing a problem caused by erroneous combination.

In one aspect of the example embodiments, a battery module may include a plurality of rechargeable batteries, each rechargeable battery including a first electrode end and a second electrode end protruding outside a case of the rechargeable battery, a first top insulation member at a bottom of the first electrode end, and an identifier on the first top insulation member, a bus bar electrically connecting ends of neighboring rechargeable batteries, a bottom housing including a space, the rechargeable batteries being arranged in the space of the bottom housing, and a top cover attached to the bottom housing, the top cover including a recognizer that fits with the identifier.

The identifier may be a protrusion, and the recognizer may be a hole or a groove into which the identifier is inserted.

The identifier may be a hole or groove, and the recognizer may be a protrusion inserted into the identifier.

The first electrode end may be fixed to a terminal plate, the terminal plate being between the first top insulation member and the first electrode end.

The first top insulation member may include a bottom plate, a sidewall protruding upward from bottom plate and wrapping around the terminal plate, and a support protruding horizontally from the sidewall, the identifier being on the support.

The first top insulation member may further include a fixing unit protruding upward from the sidewall and having a hook shape, the fixing unit contacting and supporting a top of the terminal plate.

A first rivet end may be fixed to the terminal plate, the first rivet end extending into an inner side of the rechargeable battery.

The first top insulation member may include a code unit with an identification code.

The battery module may further include an identification window in the top cover, the identification window exposing the code unit.

The battery module may further include a second top insulation member at a bottom of the second electrode end, the identifier being installed only on the first top insulation member among the first and second top insulation members.

The battery module may further include a first terminal hole and a second terminal hole in the top cover, the first electrode end being inserted into the first terminal hole, the second electrode end being inserted into the second terminal hole, and the recognizer being positioned near only the first terminal hole from among the first and second terminal holes.

The identifier may be a groove or a protrusion.

The first and second electrode ends may protrude through the top cover, the bus bar being above the top cover, and the first top insulation member being below the top cover.

The recognizer and identifier may have respective complementary shapes.

The identifier may extend from the first top insulation member into the recognizer.

The identifier may be only at one of the first and second electrode ends, a single recognizer being positioned to fit each identifier.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Figure 1:
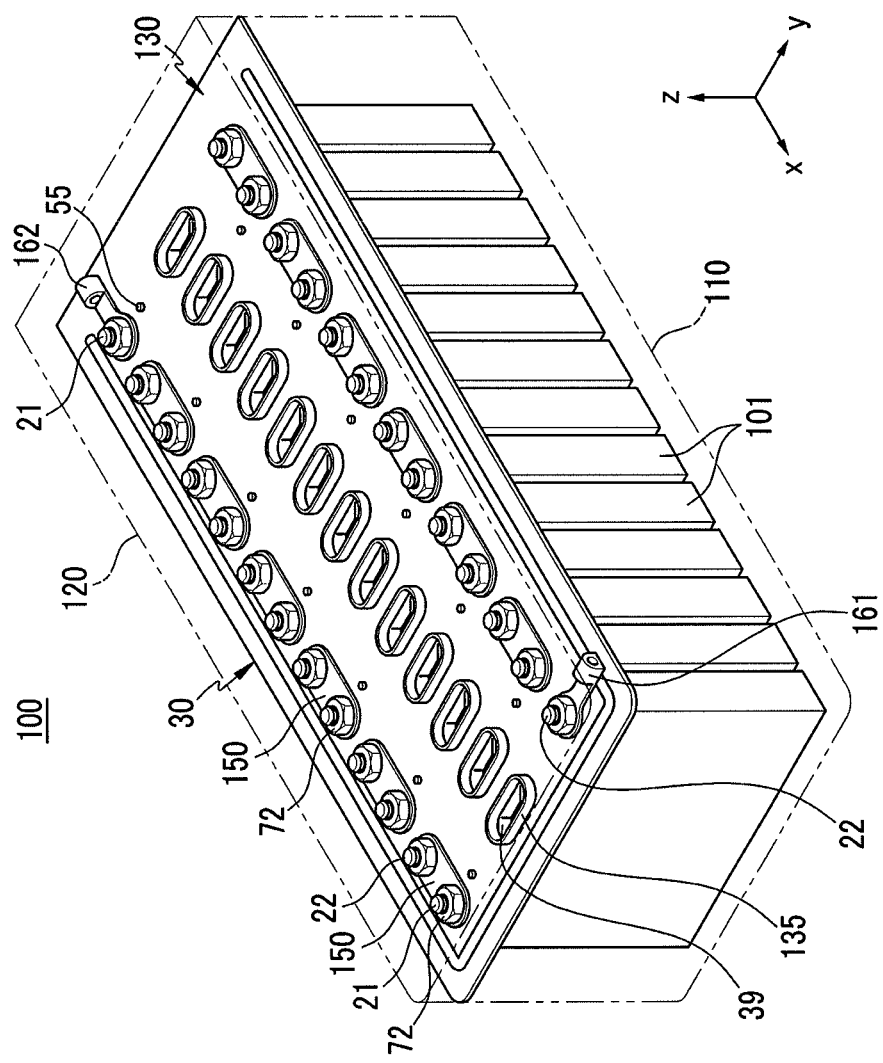
FIG. 1 illustrates a perspective view of a part of a battery module according to a first exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer (or element) is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
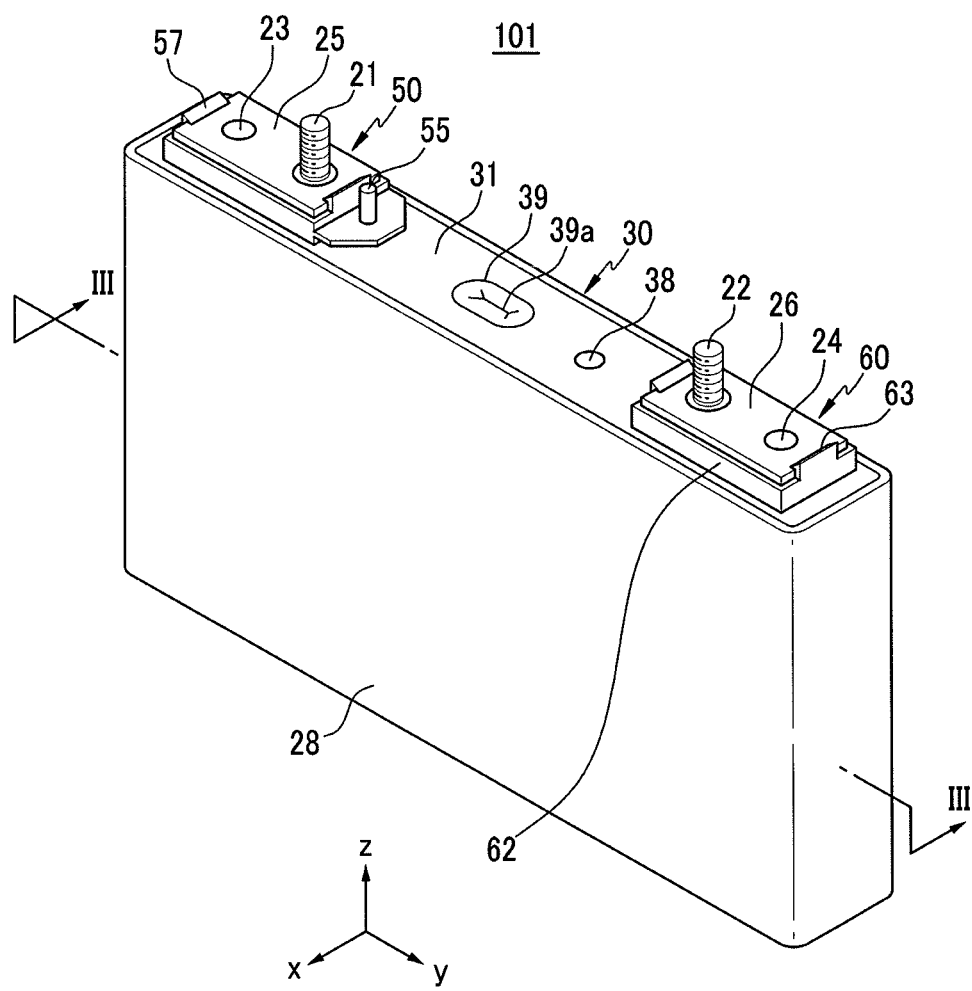
FIG. 2 illustrates a perspective view of a rechargeable battery according to a first exemplary embodiment.

FIG. 1 shows a perspective view of a part of a battery module according to a first exemplary embodiment. FIG. 2 shows a perspective view of a rechargeable battery according to the first exemplary embodiment.

Referring to FIG. 1 and FIG. 2, the battery module 100 may include a plurality of rechargeable batteries 101, a bus bar 150 for electrically connecting the rechargeable batteries 101, a bottom housing 110 having a space in which the rechargeable batteries 101 are inserted, and a top cover 130 combined with the bottom housing 110.

The bottom housing 110 may have a cuboid shape having an inner space. The top cover 130 is combined with an open side of the bottom housing 110, e.g., the top cover 130 may be formed as a plate.

The rechargeable battery 101 will be exemplified as a square-type lithium ion secondary battery. However, example embodiments are not restricted thereto, and the rechargeable battery 101 may be of any suitable type and shape, e.g., a lithium polymer battery or a cylindrical battery.

Figure 3:
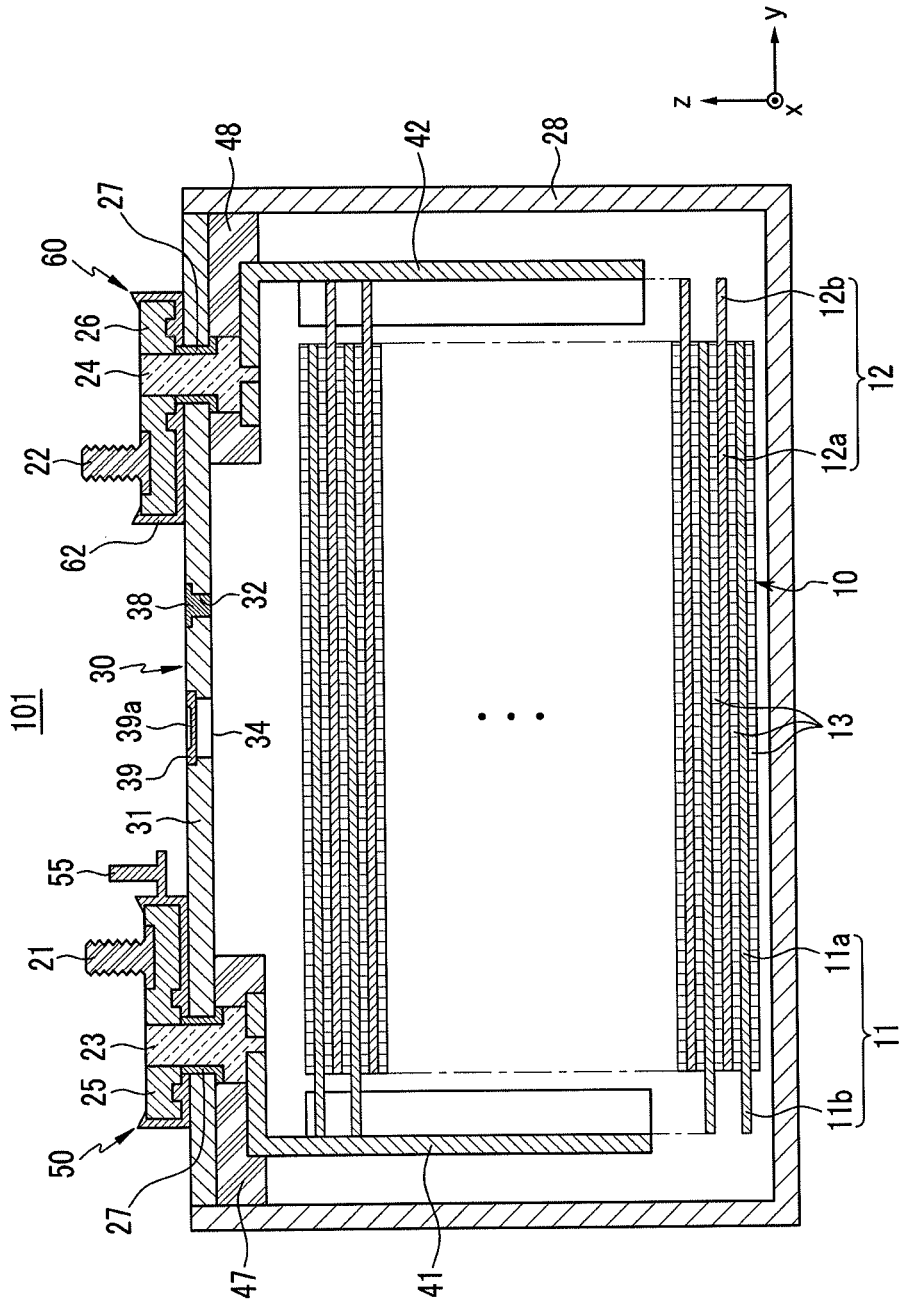
FIG. 3 illustrates a cross-sectional view with respect to line III-III of FIG. 2.

FIG. 3 shows a cross-sectional view along line III-III of FIG. 2.

Referring to FIG. 2 and FIG. 3, regarding the rechargeable battery 101, the rechargeable battery 101 may include an electrode assembly 10 that is wound with a separator 13 between a positive electrode 11 and a negative electrode 12, a case 28 in which the electrode assembly 10 is installed, and a cap assembly 30 combined with an opening of the case 28.

The positive electrode 11 may include a positive coated region 11a, i.e., a region including an active material coated on a positive electrode current collector formed of a metal foil, e.g., aluminum, and a positive uncoated region 11b, i.e., a region in which the active material is not coated. The positive uncoated region 11b is formed at a front end of the positive electrode 11 in a length direction, e.g., y direction, of the positive electrode 11.

The negative electrode 12 may include a negative coated region 12a, i.e., a region including an active material coated on a negative electrode current collector formed of a metal foil, e.g., copper, and a negative uncoated region 12b, i.e., a region in which the active material is not coated. The negative uncoated region 12b is formed at a second end of the negative electrode 12 in a length direction of the negative electrode 12.

The positive electrode 11 and the negative electrode 12 are spiral-wound with the separator 13, which is an insulator. Example embodiments are not restricted thereto, and the electrode assembly 10 may have a configuration in which the positive electrode and the negative electrode are formed with a plurality of sheets stacked with a separator therebetween.

The case 28 may have a substantially cuboidal shape, and may have an opening on one side. The case 28 may be made of a metal, e.g., aluminum or stainless steel.

The cap assembly 30 may include a cap plate 31 for covering the opening of the case 28, a first electrode end 21 protruding outside the cap plate 31 and electrically connected to the positive electrode 11, and a second electrode end 22 protruding outside the cap plate 31 and electrically connected to the negative electrode 12.

The cap plate 31 may be formed to be a long plate that is extended in one direction, and it may be combined with the opening of the case 28. A seal stopper 38 may be installed in an electrolyte injection opening 32 formed in the cap plate 31, and a vent plate 39, in which a notch 39a is formed, may be installed in a vent hole 34, so the vent plate 39 may be opened at a predetermined pressure.

The first electrode end 21 and the second electrode end 22 may protrude from a top part of the cap plate 31. The first electrode end 21 may be electrically connected to the positive electrode 11 with a first current collector 41 as a medium, and the second electrode end 22 may be electrically connected to the negative electrode 12 with a second current collector 42 as a medium. However, example embodiments are not restricted thereto, e.g., the first electrode end 21 may be electrically connected to the negative electrode and the second electrode end 22 may be electrically connected to the positive electrode.

As shown in FIG. 3, a first rivet end 23 extended into the rechargeable battery may be connected to the first current collector 41. The first rivet end 23 may pass through the cap plate 31, and may be inserted into a hole formed in the first current collector 41 to be fixed thereto, e.g., through welding.

A gasket 27 for sealing may be installed between the first rivet end 23 and the cap plate 31. The gasket 27 may be inserted into the same hole in the cap plate 31 as the first rivet end 23, and a bottom insulation member 47 for insulating the first rivet end 23 from the cap plate 31 may be installed below the cap plate 31. A terminal plate 25 may be installed at a top of the first rivet end 23, so the first rivet end 23 passes through the terminal plate 25 and is fixed to the terminal plate 25, e.g., through caulking and welding.

A bottom of the first electrode end 21 is inserted into the terminal plate 25 and is fixed to the terminal plate 25, e.g., through welding. The first electrode end 21 may be separated from the first rivet end 23 in a length direction of the terminal plate 25, e.g., horizontally. The first electrode end 21 may have a column shape, and it may have screw threads so that a nut may be combined thereto.

A second rivet end 24 may pass through the cap plate 31, and may be connected to the second current collector 42. The second rivet end 24 may be inserted into a hole formed in the second current collector 42 and may be fixed thereto, e.g., through welding. The gasket 27 for sealing may be installed between the second rivet end 24 and the cap plate 31. The gasket 27 may be inserted into the same hole through which the second rivet 24 passes, and a bottom insulation member 48 for insulating the second rivet end 24 at the cap plate 31 may be installed below the cap plate 31.

A terminal plate 26 may be installed at the top of the second rivet end 24, and the second rivet end 24 may pass through the terminal plate 26 and is fixed to the terminal plate 26, e.g., through caulking and welding. The bottom of the second electrode end 22 may be inserted into the terminal plate 26 and may be fixed to the terminal plate 26, e.g., through welding, and the second electrode end 22 may be separated from the second rivet end 24 in the length direction of the terminal plate 26. The second electrode end 22 may be formed to have a column shape, and may have screw threads so that a nut may be combined thereto.

Figure 4:
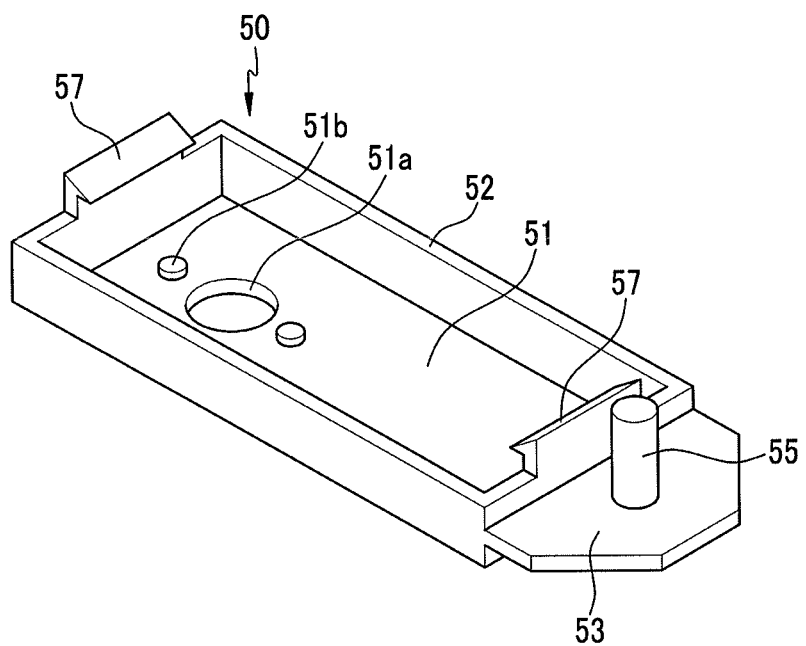
FIG. 4 illustrates a perspective view of a first electrode top insulation member according to a first exemplary embodiment.

FIG. 4 shows a perspective view of a first electrode top insulation member according to the first exemplary embodiment.

Referring to FIG. 3 and FIG. 4, a first top insulation member 50 for electrically insulating the terminal plate 25 and the cap plate 31 is installed at the bottom of the terminal plate 25 combined with the first electrode end 21. For example, the first top insulation member 50 may surround a bottom and sidewalls of the terminal plate 25, so the bottom of the first top insulation member 50 may be positioned between the terminal plate 25 and the cap plate 31.

In detail, the first top insulation member 50 may include a bottom plate 51 and a sidewall 52 protruding upward from a side of the bottom plate 51 and wrapping around the terminal plate 25. The bottom plate 51 may be formed to have a substantially rectangular plate shape, e.g., overlap an entire bottom of the terminal plate 25. The sidewall 52 may protrude upward from an end, e.g., an edge, of the bottom plate 51, e.g., to completely overlap sidewalls of the terminal plate 25.

A hole 51*a* through which the first rivet end 23 passes is formed in the bottom plate 51, and a protrusion 51*b*, e.g., with a circular cylinder shape, protruding upward from the bottom plate may be formed on both sides of the hole 51*a*. The protrusion 51*b* is inserted into the bottom of the terminal plate 25 and supports the terminal plate 25 so that it may not move.

A fixing unit 57 protruding upward to support the terminal plate 25 is formed on the sidewall 52, e.g., the fixing unit 57 may extend from a top surface of the sidewall 52 along a sidewall of the terminal plate 25. For example, the fixing unit 57 may be provided on both ends of the first top insulation member 50 in the length direction, e.g., each of the fixing units 57 may extend along the x-axis. The fixing unit 57 has a hook shape protruding to the inside of the terminal plate 25 to contact and support the top of the terminal plate 25. A top of the fixing unit 57 is formed in a slanted manner so that it may face downward as it goes to the inside of the first top insulation member 50. For example, the fixing unit 57 may include a sidewall extending along the xz plane from the sidewall 52, a horizontal surface extending from the sidewall along, e.g., directly on, a top surface of the terminal plate 25, and a slanted surface connecting the sidewall and the horizontal surface to define a structure with a triangular cross-section above the terminal plate 25. For example, the slanted surface of the fixing unit 57 may extend along an entire length of the fixing unit 57, e.g., along the x-axis, to overlap a portion of the upper surface of the terminal plate 25, e.g., to overlap two portions at opposite edges of the terminal plate 25.

A support 53 protruding to the outside and an identifier 55 protruding upward from the support 53 are formed on one sidewall of the first top insulation member 50, as illustrated in FIG. 4. The support 53 may be formed to have a plate shape protruding from the sidewall 52 at a right angle, and may be disposed in parallel with the cap plate 31. The identifier 55 may be formed to have a protrusion shape, e.g., with a circular cross-section, protruding upward from the support 53, e.g., from a center of the width direction of the support 53.

Figure 5:
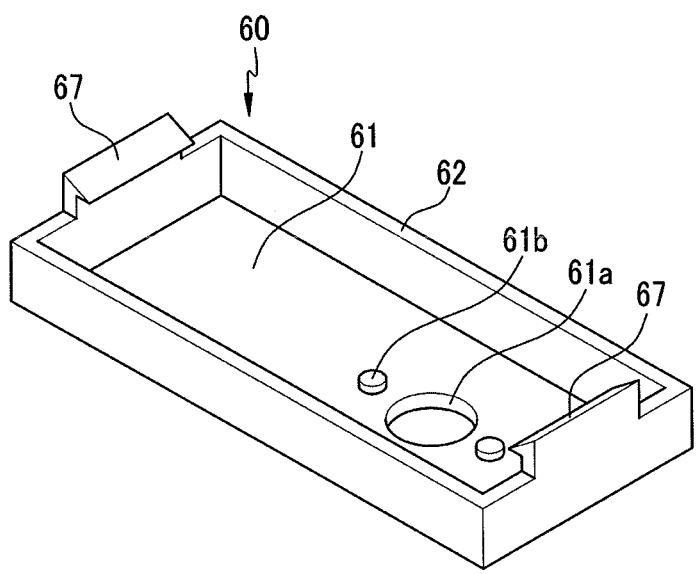
FIG. 5 illustrates a perspective view of a second electrode top insulation member according to a first exemplary embodiment.

FIG. 5 shows a perspective view of a second electrode top insulation member according to a first exemplary embodiment.

Referring to FIG. 5, a second top insulation member 60 for electrically insulating the terminal plate 26 and the cap plate 31 is installed at the bottom of the terminal plate 26 combined with the second electrode end. The second top insulation member 60 includes a bottom plate 61 and a sidewall 62 protruding upward from a side of the bottom plate 61 to wrap around the terminal plate 26. The bottom plate 61 is formed to have a substantially rectangular plate shape, and the sidewall 62 is formed to be protruded upward at ends of the bottom plate 61.

A hole 61*a* through which a second rivet end 24 passes is formed on the bottom plate 61, and a circular cylinder shaped protrusion 61*b* protruding upward is formed on both sides of the hole 61*a*. The protrusion 61*b* is inserted into the bottom of the terminal plate 26 and supports the terminal plate 26 so that it may not move.

A fixing unit 67 protruding upward to support the terminal plate 26 is formed on the sidewall 62 provided on both sides of the length direction of the second top insulation member 60. The fixing unit 67 has a hook shape that is protruding to the inside of the terminal plate 26 and contacts and supports the top of the terminal plate 26. The top of the fixing unit 67 is formed in a slanted manner so that it may face downward as it goes to the inside of the second top insulation member 60. An identifier is not formed on the second top insulation member 60. For example, the second top insulation member 60 may have the same shape and structure as the first top insulation member 50, with the exception of having no identifier.

Figure 6:
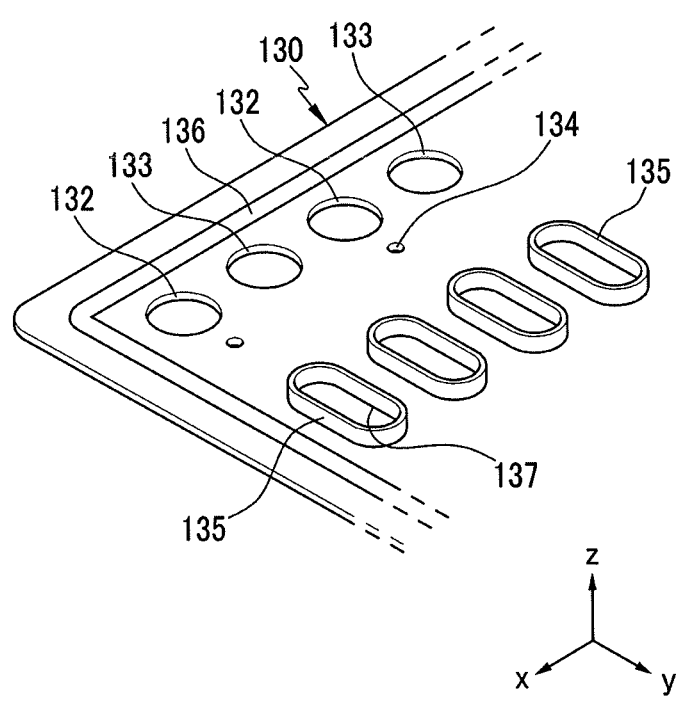
FIG. 6 illustrates a perspective view of a part of a top cover according to a first exemplary embodiment.
Figure 7:
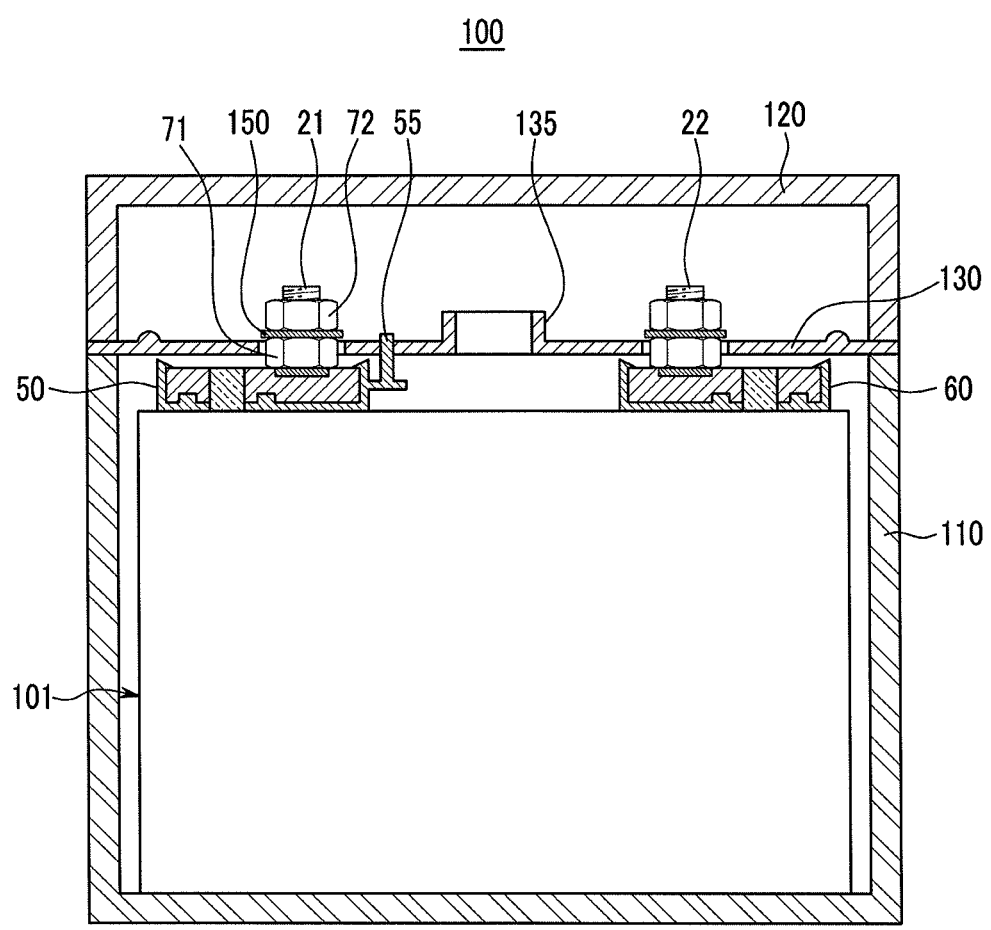
FIG. 7 illustrates a cross-sectional view of a battery module according to a first exemplary embodiment.

FIG. 6 shows a perspective view of a part of the top cover 130 of FIG. 1. FIG. 7 shows a cross-sectional view of the battery module 100 of FIG. 1.

Referring to FIG. 1, FIG. 6, and FIG. 7, a plurality of rechargeable batteries 101 may be stacked and arranged in the side direction (x-axis direction in FIG. 1) so that wide fronts of the rechargeable batteries 101 may face each other. The rechargeable batteries 101 are coupled in series by a bus bar 150. As illustrated in FIG. 1, the bus bar 150 is installed at the first electrode end 21 of one rechargeable battery 101 and the second electrode end 22 of the neighboring rechargeable battery 101, when the first electrode ends 21 of the neighboring rechargeable batteries 101 and the second electrode ends 22 are alternately disposed.

Holes are formed at both edges of the bus bar 150 in the length direction so that the first and second electrode ends 21 and 22 may be inserted into them. As illustrated in FIG. 7, the bus bar 150 is placed over a bottom nut 71 fastened to the first and second electrode ends 21 and 22, and the bus bar 150 is fixed to the first and second electrode ends 21 and 22 by a top nut 72. Therefore, a bottom of the bus bar 150 touches the bottom nut 71 and a top thereof touches the top nut 72.

As illustrated in FIG. 1, a first module end 162 may be installed at the first electrode end 21 of the rechargeable battery 101 that is disposed to the outermost part from among the rechargeable batteries 101. A second module end 161 may be installed at the second electrode end 22 of the rechargeable battery 101 that is disposed to the outermost part.

The top cover 130 may be formed to have a square plate shape, and may be provided between the rechargeable batteries 101 and the bus bar 150. The top housing 120 may be combined and fixed to the top cover 130. The top housing 120 may include a rib that protrudes downward and is combined to the bottom housing 110 to protect the bus bar 150 and the first and second electrode ends 21 and 22.

The top cover 130 may be combined to an opening of the bottom housing 110 and may be fixed to the bottom housing 110 with a bolt (not shown). A reinforcement rib 136 protruding along an edge may be formed on the top cover 130. The reinforcement rib 136 prevents the top cover 130 from being deformed or damaged by an external impact.

A first terminal hole 132, into which the first electrode end 21 is inserted, and a second terminal hole 133, into which the second electrode end 22 is inserted, may be formed in the top cover 130. The first terminal hole 132 and the second terminal hole 133 may be alternately disposed in the length direction of the top cover 130.

Also, an exhaust hole 137 may be formed in the top cover, and it may be provided at the top of a vent plate 39 installed in the rechargeable battery 101. An exhaust protrusion 135 may be formed at a circumference of the exhaust hole 137. Therefore, when the vent plate 39 is opened, gas inside the rechargeable battery 101 may be quickly discharged by way of the exhaust hole 137 and the exhaust protrusion 135.

A recognizer 134 combined with the identifier 55 may be formed on a side of the first terminal hole 132. The recognizer 134 is a hole (FIG. 6), so a top of the identifier 55 may be inserted through the recognizer 134 to protrude above the top cover 130 (FIG. 7). The recognizer 134 is disposed near the first terminal hole 132 but not near the second terminal hole 133. That is, as illustrated in FIG. 6, the recognizer 134 is alternately disposed only next to the first terminal hole 132, so the top of the identifier 55 protrudes above the top cover 133 only at positions adjacent to the first terminal hole 132 (FIG. 1).

As assembly of the battery module 100 requires insertion of the identifier 55 through the recognizer 134, the top cover 130 may be installed only when the first electrode end 21 and the second electrode end 22 are arranged at predetermined positions, i.e., when the first and second electrode ends 21 and 22 of the plurality of rechargeable batteries 101 are arranged to have respective identifiers 55 of each rechargeable battery 101 at corresponding recognizers 134. Therefore, if the first electrode end 21 and the second electrode end 22 are provided at incorrect positions, respective identifiers 55 of each rechargeable battery 101 may not fit through the top cover 130, so erroneous combination of the first electrode end 21 and the second electrode end 22 may be prevented.

Figure 8:
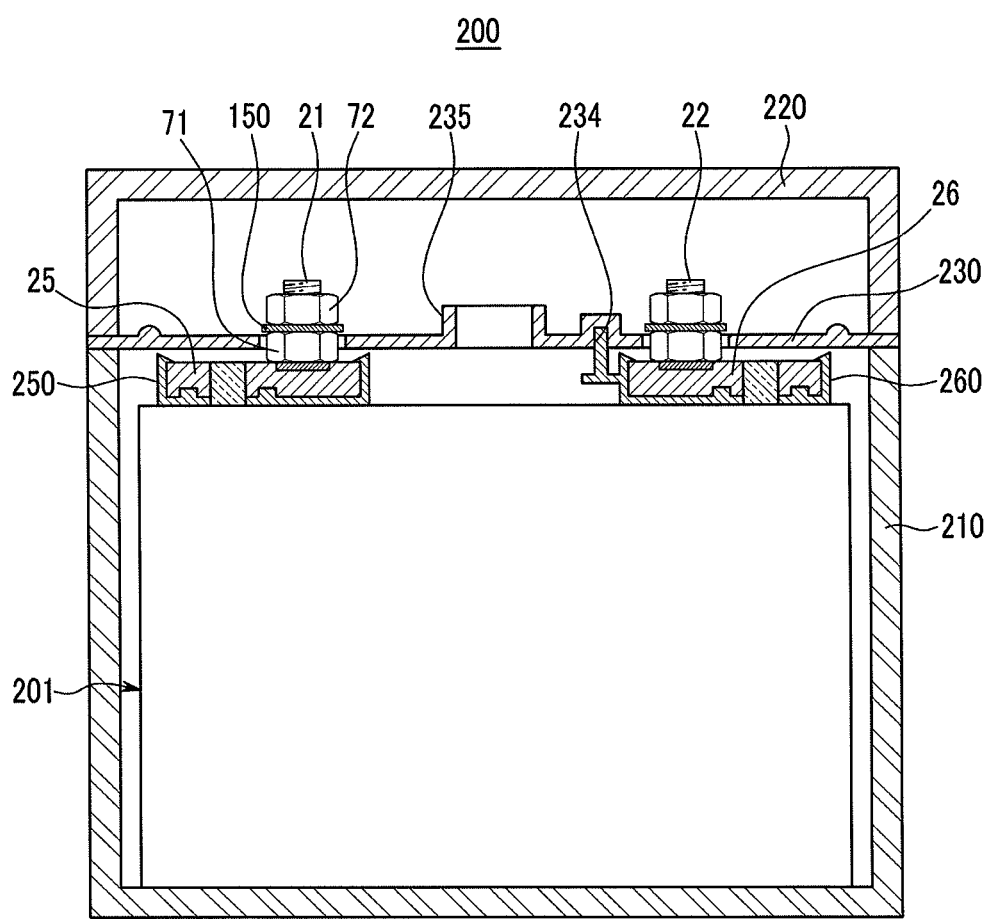
FIG. 8 illustrates a cross-sectional view of a battery module according to a second exemplary embodiment.

FIG. 8 shows a cross-sectional view of a battery module according to a second exemplary embodiment.

Referring to FIG. 8, a battery module 200 may include a plurality of rechargeable batteries 201, the bus bar 150 for electrically connecting the rechargeable batteries 201, a bottom housing 210 having a space into which the rechargeable battery 201 is inserted, and a top cover 230 combined to the bottom housing 210.

The bottom housing 210 may have a substantially cuboidal shape having an inner space, and its top may be open. The top cover 230 may have a plate shape and may be combined to the open top of the bottom housing 210.

A top housing 220 may be combined and fixed to the top of the top cover 230. The top housing 220 may include a rib protruding downward, and it may be combined to the bottom housing 210 to protect the bus bar 150 and the first and second electrode ends 21 and 22.

The battery module 200 may have the same configuration as the battery module 100 according to the first exemplary embodiment, except the configuration of top insulation members 250 and 260 and the top cover 230. The first electrode end 21 may be fixed to the terminal plate 25, and the first top insulation member 250 is installed between the terminal plate 25 and the cap plate 31. The second electrode end 22 may be fixed to the terminal plate 26, and a second top insulation member 260 is installed between the terminal plate 26 and the cap plate 31. An identifier 265 protruding upward may be formed on the second top insulation member 260 from among the first top insulation member 250 and the second top insulation member 260.

Figure 9:
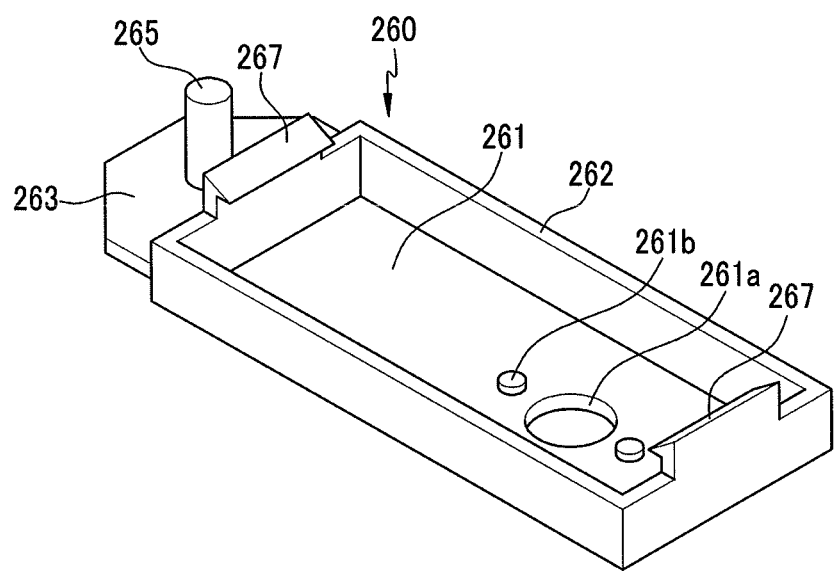
FIG. 9 illustrates a perspective view of a second top insulation member according to a second exemplary embodiment.

FIG. 9 shows a perspective view of the second top insulation member 260 according to the second exemplary embodiment.

Referring to FIG. 9, the second top insulation member 260 includes a bottom plate 261, and a sidewall 262 protruded upward at a side of the bottom plate 261 and wrapping around the side of the terminal plate 26. The bottom plate 261 may have a substantially rectangular plate shape, and the sidewall 262 may protrude perpendicularly upward from each side of the bottom plate 261.

A hole 261a, through which a rivet end passes, is formed in the bottom plate 261, and a, e.g., circular cylinder shaped, protrusion 261b protruding upward is formed on both sides of the hole 261a. The protrusion 261b is inserted into the bottom of the terminal plate 26 to support the terminal plate 26 so that it may not move.

A fixing unit 267 protruding upward to support the terminal plate 26 is formed on the sidewall 262 provided on both sides of the length direction of the second top insulation member 260. The fixing unit 267 has a hook shape protruding to the inside of the terminal plate 26 to contact and support the top of the terminal plate 26. The top of the fixing unit 267 is formed in a slanted manner so that it may face downward as it goes to the inside of the second top insulation member 260.

A support 263 protruding to the outside and an identifier 265 protruding upward from the support 263 are formed on one sidewall of the second top insulation member 260. The support 263 may be formed to have a plate shape protruding from the sidewall 262 at a right angle and is disposed in parallel with the cap plate 31. The identifier 265 is formed to have a protrusion shape, e.g., with a circular cross-section, protruding upward from the support 263, and it is disposed in a center of the width direction of the support 263.

Further, a recognizer 234, into which the identifier 265 is inserted, is formed on the top cover 230. The recognizer 234 is provided at the top of the identifier 265 and is combined with the identifier 265. The recognizer 234 includes a bottom that has a concave groove so that the identifier 265 may be inserted into the concave groove. The recognizer 234 is disposed near a hole into which the second electrode end 22 is inserted. Therefore, when the first electrode end 21 and the second electrode end 22 are disposed at wrong positions, the identifier 265 cannot be inserted into and combined with the recognizer 234. Therefore, the top cover 230 may not be installed at a predetermined position when the first electrode end 21 and the second electrode end 22 are disposed at wrong positions.

Figure 10:
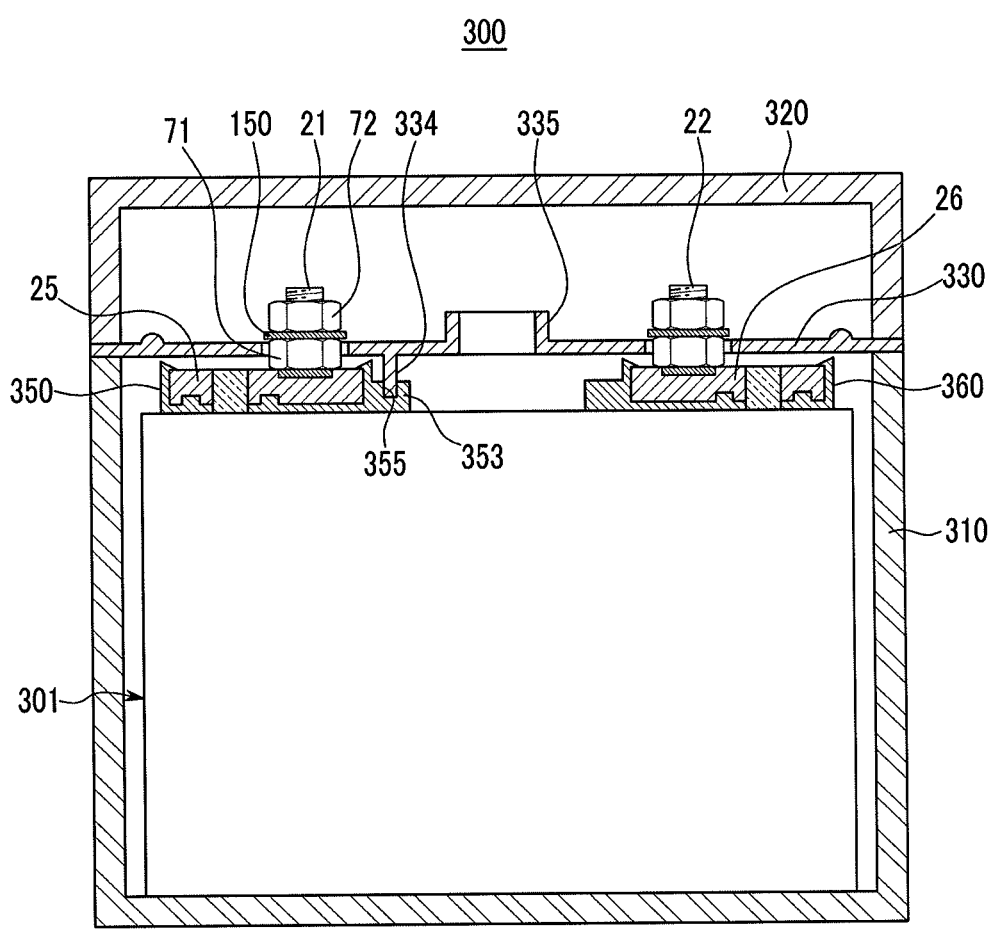
FIG. 10 illustrates a cross-sectional view of a battery module according to a third exemplary embodiment.

FIG. 10 shows a cross-sectional view of a battery module according to a third exemplary embodiment.

Referring to FIG. 10, a battery module 300 may include a plurality of rechargeable batteries 301, the bus bar 150 for electrically connecting the rechargeable batteries 301, a bottom housing 310 having a space into which the rechargeable battery 301 is inserted, and a top cover 330 combined to the bottom housing 310.

The bottom housing 310 may have a substantially cuboidal shape having an inner space, and its top may be open. The top cover 330 may have a plate shape and may be combined with the open top of the bottom housing 310.

A top housing 320 may be combined and fixed to the top of the top cover 330. The top housing 320 may include a rib protruding downward, and it may be combined to the top cover 330 or the bottom housing 310 to protect the bus bar 150 and the first and second electrode ends 21 and 22.

The battery module 300 may have the same configuration as the battery module 100 according to the first exemplary embodiment, except the configuration of top insulation members 350 and 360 and the top cover 330. The first electrode end 21 may be fixed to the terminal plate 25, and a first top insulation member 350 is installed between the terminal plate 25 and the cap plate 31. The second electrode end 22 may be fixed to the terminal plate 26, and a second top insulation member 360 is installed between the terminal plate 26 and the cap plate 31. A concave identifier 355 is formed on the first top insulation member 350 from among the first top insulation member 350 and the second top insulation member 360.

Figure 11:
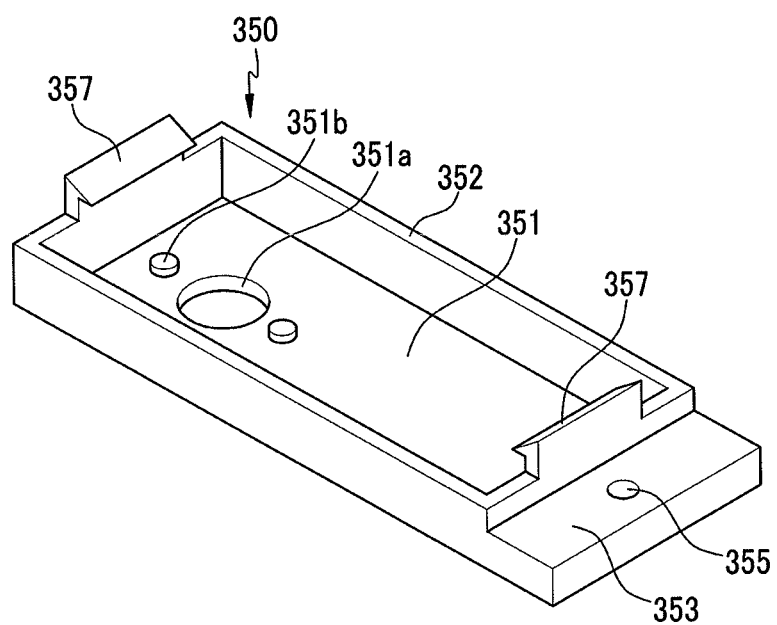
FIG. 11 illustrates a perspective view of a first top insulation member according to a third exemplary embodiment.
Figure 12:
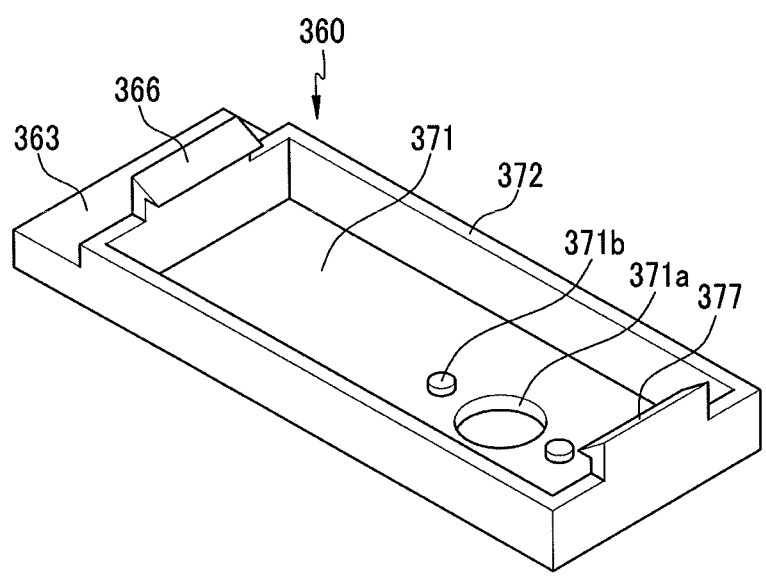
FIG. 12 illustrates a perspective view of a second top insulation member according to a third exemplary embodiment.

FIG. 11 shows a perspective view of the first top insulation member 350 according to a third exemplary embodiment. FIG. 12 shows a perspective view of a second top insulation member 360 according to the third exemplary embodiment.

Referring to FIG. 11 and FIG. 12, the first top insulation member 350 includes a bottom plate 351 and a sidewall 352 protruding upward at a side of the bottom plate 351 and wrapping around the side of the terminal plate 25. The bottom plate 351 may have a substantially rectangular plate shape, and the sidewall 352 may protrude perpendicularly upward from each side of the bottom plate 351.

A hole 351a, through which a rivet end passes, is formed in the bottom plate 351, and a, e.g., circular cylinder shaped, protrusion 351b protruding upward is formed on both sides of the hole 351a. The protrusion 351b is inserted into the bottom of the terminal plate 25 to support the terminal plate 25 so that it may not move.

A fixing unit 357 protruding upward to support the terminal plate 25 is formed on the sidewall 352 provided on both sides of the length direction of the first top insulation member 350. The fixing unit 357 has a hook shape that is protruded to the inside of the terminal plate 25 and contacts and supports the top of the terminal plate 25.

A support 353 protruding to the outside is formed on one sidewall 352 of the first top insulation member 350, and a concave identifier 355 is formed in the support 353. The support 353 is formed to have a step shape protruding from the sidewall 352 at a right angle, and a bottom of the support 353 contacts the cap plate. The identifier 355 is formed to have a groove shape that is formed, e.g., at the center in the width direction of the support 353.

The second top insulation member 360 includes a bottom plate 371, and a sidewall 372 protruding upward at the side of the bottom plate 371 to wrap around the side of the terminal plate 26. The bottom plate 371 may be formed to have a substantially rectangular plate shape, and the sidewall 372 is perpendicularly protruding upward at each side of the bottom plate 371.

A hole 371a, through which a rivet end passes, is formed in the bottom plate 371, and a, e.g., circular cylinder shaped, protrusion 371b protruding upward is formed on both sides of the hole 371a. The protrusion 371b is inserted into the bottom of the terminal plate 26 and supports the terminal plate 26 so that it may not move.

A fixing unit 377 protruded upward to support the terminal plate 26 is formed on the sidewall 372 provided on both sides of the second top insulation member 360 in the length direction. The fixing unit 377 has a hook shape that is protruded to the inside of the terminal plate 26 and contacts and supports the top of the terminal plate 26.

A support 363 protruding to the outside is formed on one sidewall 372 of the second top insulation member 360. The support 363 is formed to have a step shape protruding from the sidewall 372 at a right angle, and a bottom of the support 363 touches the cap plate.

An identifier is not formed on the second top insulation member 360, so the identifier 355 is formed only on the first top insulation member 350. A recognizer 334, with which the identifier 355 is combined, is formed on the top cover 330, so the recognizer 334 extends downward from the top cover 330 to fit into and combine with the identifier 355. The recognizer 334 is formed as a protrusion that is inserted into the identifier 355, e.g., he recognizer 334 may be formed as a circular cylinder shaped protrusion protruding downward toward the identifier 355.

The recognizer 334 is disposed near the hole into which the first electrode end 21 is inserted. Therefore, when the first electrode end 21 and the second electrode end 22 are disposed at the wrong positions, the recognizer 334 is not combined with the identifier 355. Therefore, the top cover 330 may not be installed when the first electrode end 21 and the second electrode end 22 are disposed at the wrong positions.

Figure 13:
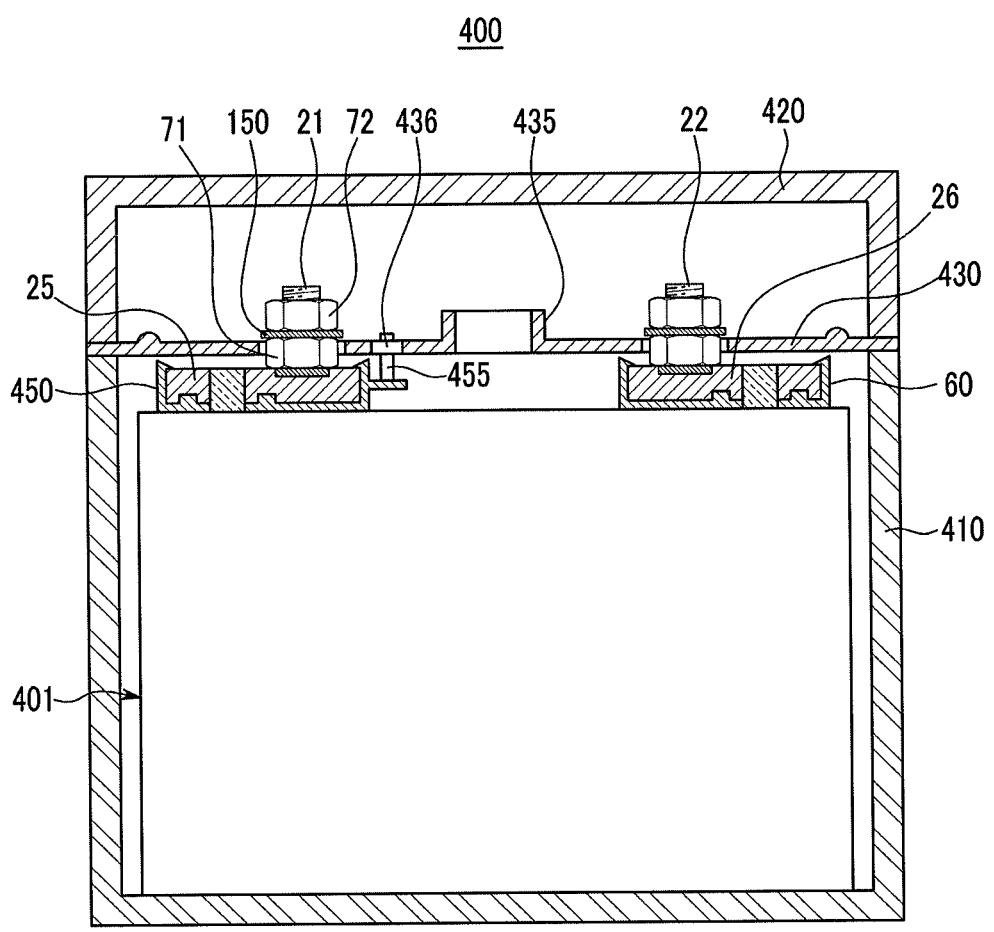
FIG. 13 illustrates a cross-sectional view of a battery module according to a fourth exemplary embodiment.

FIG. 13 shows a cross-sectional view of a battery module according to a fourth exemplary embodiment.

Referring to FIG. 13, a battery module 400 may include a plurality of rechargeable batteries 401, the bus bar 150 for electrically connecting the rechargeable batteries 401, a bottom housing 410 into which the rechargeable battery 401 is inserted, and a top cover 430 combined with the bottom housing 410.

The bottom housing 410 may be formed to have a substantially cuboid shape having an inner space, and the top cover 430 may be combined to an open side of the bottom housing 410 and may be formed to have a plate shape. A top housing 420 may be combined and fixed to the top cover 430.

The battery module 400 may have the same configuration as the battery module 100 according to the first exemplary embodiment, except the configuration of the first top insulation member 450 and the top cover 430.

The first electrode end 21 may be fixed to the terminal plate 25, and a first top insulation member 450 is installed between the terminal plate 25 and the cap plate 31. The second electrode end 22 may be fixed to the terminal plate 26, and a second top insulation member 460 is installed between the terminal plate 26 and the cap plate 31.

A protruded identifier 455 and an identification code unit 456, on which a code is formed, are formed on the first top insulation member 450 from among the first top insulation member 450 and the second top insulation member 460. The second top insulation member 460 has the same configuration as the second top insulation member according to the first exemplary embodiment so no repeated description will be given.

Figure 14:
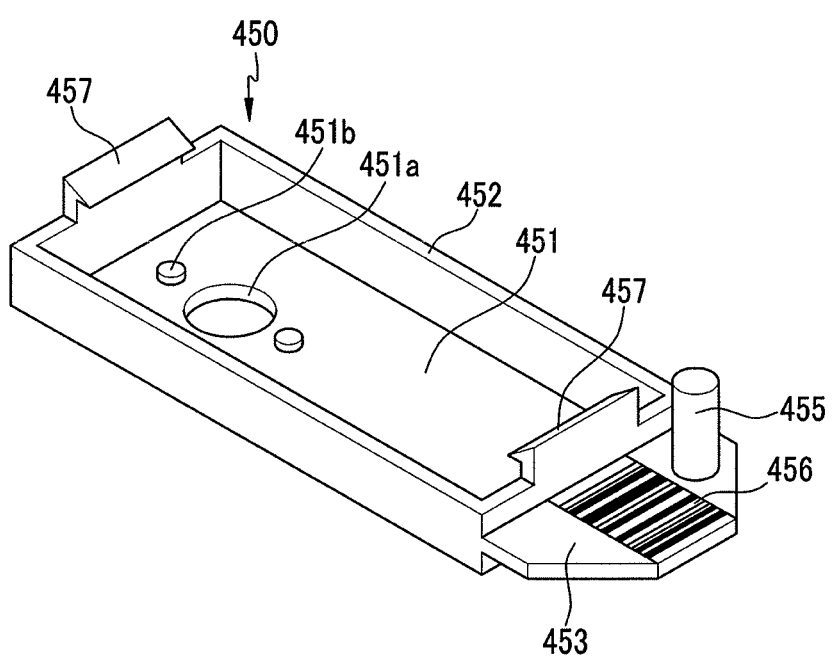
FIG. 14 illustrates a perspective view of a first top insulation member according to a fourth exemplary embodiment.

FIG. 14 shows a perspective view of the first top insulation member 450 according to a fourth exemplary embodiment.

Referring to FIG. 14, the first top insulation member 450 includes a bottom plate 451 and a sidewall 452 protruding upward from a side of the bottom plate 451 to wrap around the side of the terminal plate 25. The bottom plate 451 may be formed to have a substantially rectangular plate shape, and the sidewall 452 may be formed to be perpendicularly protruded upward at each side of the bottom plate 451.

A hole 451a, through which a rivet end passes, is formed in the bottom plate 451, and a, e.g., circular cylinder shaped, protrusion 451b protruding upward is formed on both sides of the hole 451a. The protrusion 451b is inserted into the bottom of the terminal plate 25 to support and immobilize the terminal plate 25 so that it may not move.

A fixing unit 457 protruding upward to support the terminal plate 25 is formed on the sidewall 452, and is provided on both sides of the first top insulation member 450 in the length direction. The fixing unit 457 is formed to have a hook shape protruded to the inside of the terminal plate 25 to touch the top of the terminal plate 25 and support the same.

A support 453 protruding to the outside is formed on one sidewall of the first top insulation member 450, and a code unit 456 and an identifier 455 are formed on the support 453. The support 453 is formed to have a plate protruding from the sidewall 452 at a right angle and is parallel with the cap plate.

The code unit 456 is disposed, e.g., in the center of the width direction of the support 453, and the identifier 455 is disposed to one side of the width direction from the center of the support 453. This is an example, and the identifier 455 can be disposed in the center and the code unit 456 can be disposed in one side direction.

An identification code for identifying a positive electrode is attached to the code unit 456. The identification code includes a barcode and a quick response (QR) code. The identification code includes various kinds of information on the rechargeable battery, e.g., a serial number and a manufacturing date of the rechargeable battery in addition to information for identifying the positive electrode. The identifier 455 is formed to have a protrusion, e.g., having a circular cross-section protruded upward from the support 453, and it is disposed, e.g., in the center of the width direction of the support 453.

Figure 15:
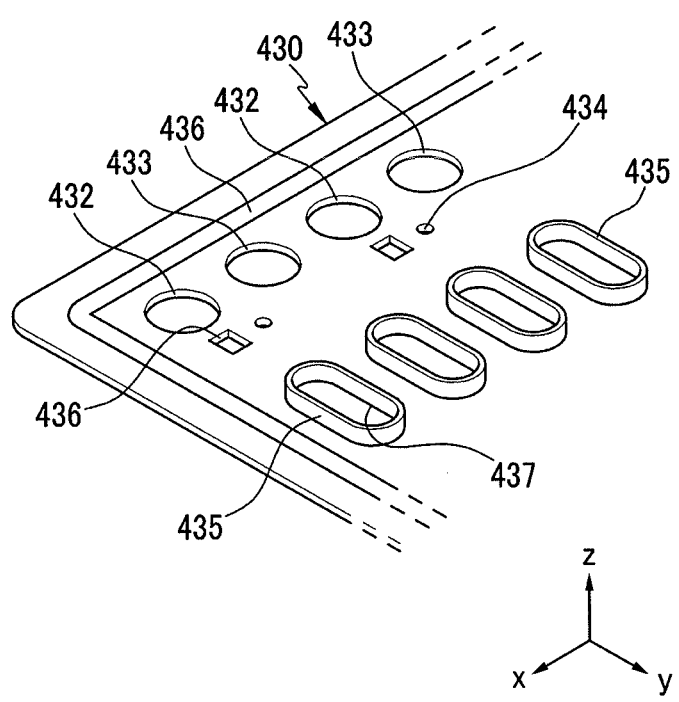
FIG. 15 illustrates a partial perspective view of a top cover according to a fourth exemplary embodiment.

FIG. 15 shows a partial perspective view of a top cover according to a fourth exemplary embodiment.

Referring to FIG. 13 and FIG. 15, the top cover 430 may be formed to have a square plate shape, and is provided between the rechargeable batteries 401 and the bus bar 150. A top housing 420 may be combined with and fixed to the top cover 430.

A first terminal hole 432, into which the first electrode end 21 is inserted, and a second terminal hole 433, into which the second electrode end 22 is inserted, are formed in the top cover 430, and the first terminal hole 432 and the second terminal hole 433 are alternately disposed in the length direction of the top cover 430. An exhaust hole 437 may be formed in the top cover 430, and an exhaust protrusion 435 may be formed on the circumference of the exhaust hole 437.

An identification window 436 provided on the top of the code unit 456 is formed on the side of the first terminal hole 432. The identification window 436 may be formed to have a rectangular hole, and the code unit 456 may be exposed upward through the identification window 436.

Further, a recognizer 434 combined with the identifier 455 is formed on the side of the identification window 436. The recognizer 434 is configured with a hole, into which the identifier 455 is inserted and combined, and the top of the identifier 455 is inserted therein. The identification window 436 and the recognizer 434 are formed on the side of the first terminal hole 432, and they are not formed on the side of the second terminal hole 433.

When the code unit 456 and the identification window 436 are formed as described above, a disposition state and information on the rechargeable batteries 401 can be acquired by using a scanner. Also, when the identifier 455 and the recognizer 434 are formed at the position at which the first electrode end 21 and the second electrode end 22 are set, the top cover 430 can be installed. Therefore, when the first electrode end 21 and the second electrode end 22 are provided at the wrong position, they are not installed on the top cover 430 by the identifier 455.

By way of summation and review, according to example embodiments, each rechargeable battery may include an identifier only on one side thereof, so correct arrangement of a plurality of rechargeable batteries may enable insertion of the correctly arranged identifiers into corresponding recognizers in a top cover. Accordingly, a problem caused by erroneous arrangement of rechargeable batteries may be prevented, as incorrect arraignment of rechargeable batteries according to example embodiments would prevent insertion of the identifiers into corresponding recognizers, i.e., it is impossible to assemble the positive terminals and the negative terminals when they are disposed incorrectly.

In contrast, when a shape of a positive terminal is similar to that of a negative terminal in a conventional battery, it may be difficult to identify the positive terminal and the negative terminal. As such, when a plurality of conventional rechargeable batteries is incorrectly arranged into a conventional battery module, the battery module may not operate properly. Also, when the terminal is made of a metal, it may be difficult to change the shape of the terminal, increase production costs, and make the automation process complicated.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the example embodiments as set forth in the following claims.

What is claimed is:

1. A battery module, comprising:
   a plurality of rechargeable batteries, each rechargeable battery including:
      a first electrode end and a second electrode end protruding outside a case of the rechargeable battery,
      a first top insulator at a bottom of the first electrode end, and an identifier on the first top insulator;
   a bus bar electrically connecting ends of neighboring rechargeable batteries;
   a bottom housing including a space, the rechargeable batteries being arranged in the space of the bottom housing; and
   a top cover attached to the bottom housing, the top cover including a recognizer aligned with the identifier, wherein the identifier is visible outside the case, wherein the first electrode end is fixed to a terminal plate, the terminal plate being between the first top insulator and the first electrode end, and wherein the first top insulator includes:
   a bottom plate,
   a sidewall protruding upward from bottom plate and wrapping around the terminal plate, and
   a support protruding horizontally from the sidewall, the identifier being on the support.

2. The battery module as claimed in claim 1, wherein
   the identifier is a protrusion, and
   the recognizer is a hole or a groove into which the identifier is inserted.

3. The battery module as claimed in claim 1, wherein
   the identifier is a hole or groove, and
   the recognizer is a protrusion inserted into the identifier.

4. The battery module as claimed in claim 1, wherein the first top insulator further comprises a fixing unit protruding upward from the sidewall and having a hook shape, the fixing unit contacting and supporting a top of the terminal plate.

5. The battery module as claimed in claim 1, wherein a first rivet end is fixed to the terminal plate, the first rivet end extending into an inner side of the rechargeable battery.

6. The battery module as claimed in claim 1, wherein the first top insulator includes a code unit with an identification code.

7. The battery module as claimed in claim 6, further comprising an identification window in the top cover, the identification window exposing the code unit.

8. The battery module as claimed in claim 1, further comprising a second top insulator at a bottom of the second electrode end, the identifier being installed only on the first top insulator among the first and second top insulators.

9. The battery module as claimed in claim 8, further comprising
   a first terminal hole and a second terminal hole in the top cover, the first electrode end being inserted into the first terminal hole, the second electrode end being inserted into the second terminal hole, and the recognizer being positioned near only the first terminal hole from among the first and second terminal holes.

10. The battery module as claimed in claim 1, wherein the identifier is a groove or a protrusion.

11. The battery module as claimed in claim 1, wherein the first and second electrode ends protrude through the top cover, the bus bar being above the top cover, and the first top insulator being below the top cover.

12. The battery module as claimed in claim 1, wherein the recognizer and identifier have respective complementary shapes.

13. The battery module as claimed in claim 1, wherein the identifier extends from the first top insulator into the recognizer.

14. The battery module as claimed in claim 1, wherein the identifier is only at one of the first and second electrode ends, a single recognizer being positioned to fit each identifier.

* * * * *